United States Patent [19]

Hansson et al.

[11] Patent Number: 4,548,122
[45] Date of Patent: Oct. 22, 1985

[54] MORTAR CARRIAGE

[75] Inventors: Börje Hansson, Märsta; Börje Johansson; Torbjörn Pramskog, both of Eskilstuna, all of Sweden

[73] Assignee: Forenade Fabriksverken, Eskilstuna, Sweden

[21] Appl. No.: 525,242

[22] Filed: Aug. 22, 1983

[30] Foreign Application Priority Data

Aug. 25, 1982 [SE] Sweden .................................. 8204876

[51] Int. Cl.$^4$ .......................... F41F 1/06; F41F 21/10
[52] U.S. Cl. .................................. 89/37.05; 89/41.02
[58] Field of Search ................. 89/37 C, 41 M, 41 CE

[56] References Cited

U.S. PATENT DOCUMENTS

| 1,238,503 | 8/1917 | Fiske et al. ...................... 89/41 CE |
| 3,745,879 | 7/1973 | Asikainen et al. ................. 89/37 C |
| 3,782,243 | 1/1974 | Ziegler ............................... 89/37.05 |
| 3,866,515 | 2/1975 | Ziegler et al. ....................... 89/37 C |

Primary Examiner—Stephen C. Bentley
Attorney, Agent, or Firm—Fleit, Jacobson, Cohn & Price

[57] ABSTRACT

A mortar carriage includes a holder (10) for a tube (19) and two angularly related legs (11, 12). The legs have adjustment devices (112, 122) for adjustment of the length.

A sensor (13) senses the incline of site and the elevation of the tube (19) and controls the electric motors (111, 121) which drive the adjustment devices (112, 122).

Control devices with a counting unit (20) controls the automatic adjustment of the length of the legs (11, 12) by coarse adjustment of incline of site and elevation respectively and after that fine adjustment of incline of site and elevation respectively. At the adjustments for incline of site the actuation of the legs (11, 12) happens in opposite directions and at the adjustment for elevation the actuation happens in the same directions.

The control devices comprises units (for example 210-212-20-26-261-25-27-28) for generating a drive current of direct current type during the coarse adjustments and units (for example 220-222-20-26-262-271-25-27-28) for generating a drive current of pulse type during the fine adjustments.

4 Claims, 2 Drawing Figures

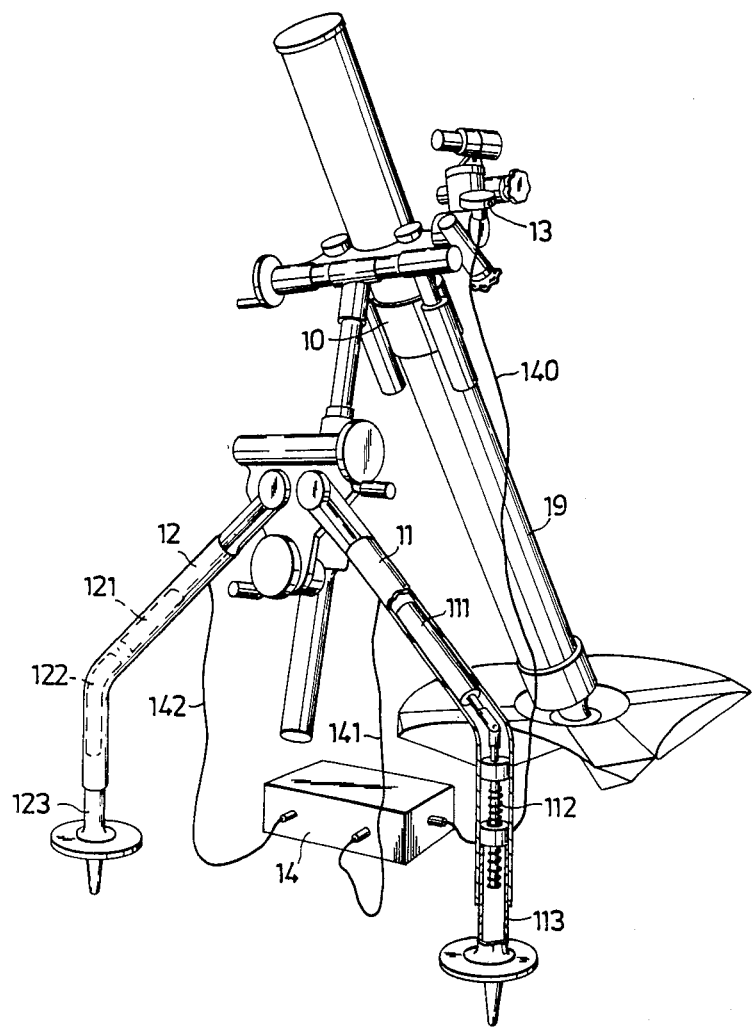

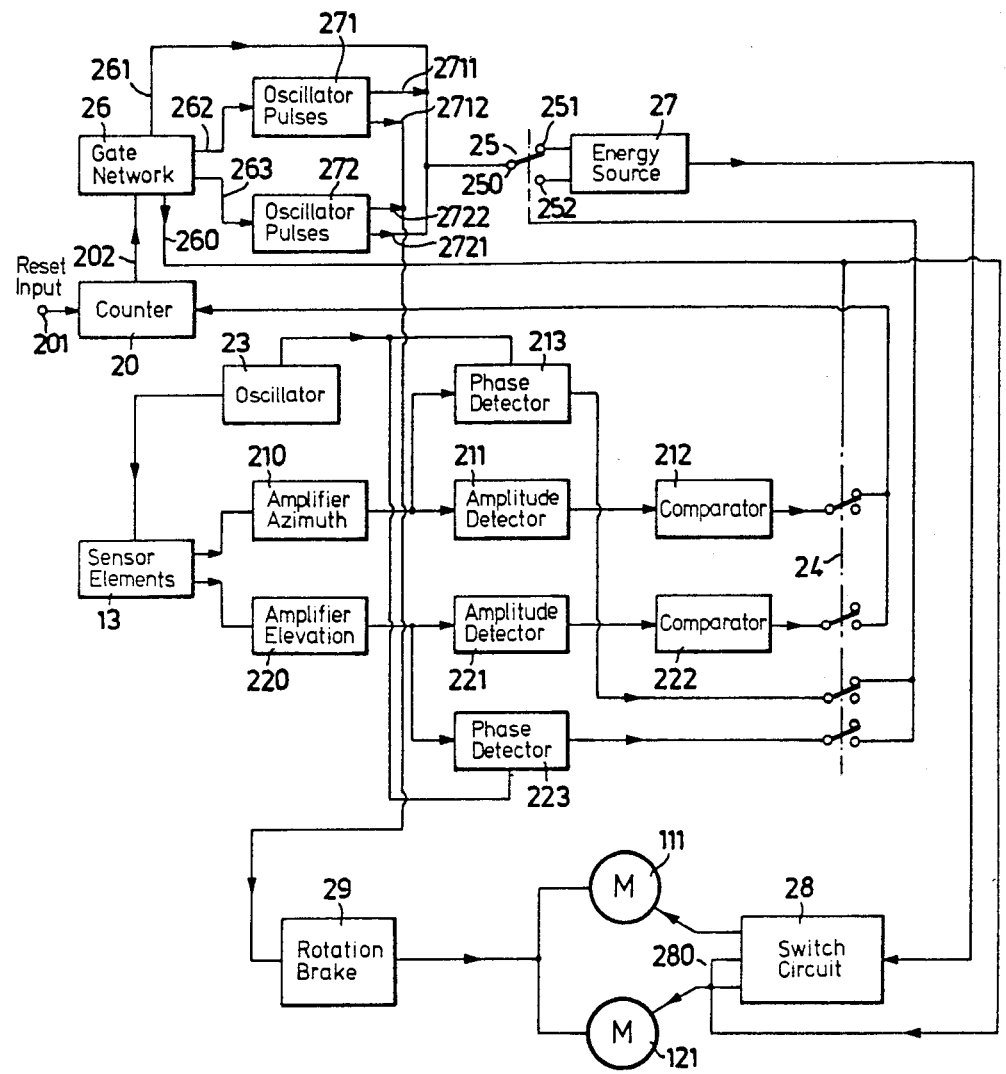

MORTAR CARRIAGE

FIELD OF THE INVENTION

The invention refers to a mortar carriage which includes a holder for mortar tube and two supporting angularly related legs which are each equipped with an adjustment device for individual adjustment of the length of the supporting leg in question.

DESCRIPTION OF PRIOR ART

For conventional mortars it is generally necessary to manually adjust (regulate) the incline of site of the mortar carriage and the elevation and the side position of the tube, as a rule after every shot.

Automatic adjustment of tubes is per se earlier known but, for different reasons, the existing embodiments are not suitable for mortar carriages. They are in general too complicated to be built into already existing carriages and do not have the necessary speed and accuracy.

SUMMARY OF THE INVENTION

With a mortar carriage of the kind mentioned above, a sensor is arranged for sensing the incline of site and the elevation of the tube and has as an adjustment device an electric motor for adjusting the length of the supporting leg in question in dependence on the performed sensing operation.

By introducing an automatic adjustment for the incline of site and the elevation of the mortar carriage, a shorter adjustment time between every shot is achieved and with that a greater rate of fire and less necessary manual work is required whereby the operating crew for a normal armament could be decreased from 5 to 3 or 4 men. The same advantages are obtained with mortars mounted on cars.

Other characteristics for a mortar carriage arranged according to the invention appear from the attached claims.

BRIEF DESCRIPTION OF THE DRAWINGS

The invention will be more closely described in relation to the attached drawings where FIG. 1 shows a mortar carriage with a tube belonging to it and FIG. 2 shows a control device for automatic adjustment of the supporting legs of the carriage.

PREFERRED EMBODIMENT

The mortar carriage according to FIG. 1 comprises two supporting angularly related legs 11, 12, which carry a holder 10 for a tube 19. For sensing the incline of site (the angle with the horizontal plane) and the elevation (the angle between the direction of the tube and the horizontal plane) there is on the holder 19 a sensor 13 which comprises two sensor elements built together of which one senses the incline of site and one the elevation.

Such sensors are per se well-known and will therefore not be discussed in detail here. They give in unbalance (angle deviation) a high output voltage which, when balance is reached after adjustment, falls down towards zero.

The two supporting angularly related legs 11, 12 each contains an adjustment device 112 and 122 respectively, comprising a turnable lead screw and a fixed nut and an electric motor 111 and 121 respectively for turning the lead screw. The motor is placed in the upper part of the supporting leg and the fixed nut is fastened in a movable leg part 113 and 123 respectively in the lower part of the supporting leg. When for example the motor 111 rotates the belonging lead screw turns in the fixed nut and the movable leg part 113 is displaced out of or into the supporting leg 11 in dependence of the direction of rotation of the motor.

Control devices for adjustment of the supporting legs 11, 12 and a current source for the motors 111, 121 are collected in a unit 14 to which is led a conductor 140 from the sensor 13 and from which are led conductors 141 and 142 respectively to the leg 11 and 12 respectively. Besides the carriage is, as appears from FIG. 1, equipped with mechanical adjustment devices, telescopic sight etc., parts which there is here no reason to go into greater detail.

The electric control devices in the unit 14 will now be described more closely. As appears from FIG. 2 the sensor 13 with its two outputs is connected to a series connection of an amplifier 210, an amplitude detector 211 and a comparator 212 referring to incline of site and to a series connection of an amplifier 220, an amplitude detector 221 and a comparator 222 referring to elevation respectively. Each series connection has a phase detector 213 and 223 respectively connected to the connection point between amplifier and detector. An oscillator 23 is connected to the sensor 13 (in order to feed a wheatstone-bridge) and also to the phase detectors 213, 223. Outputs of the two series connections and the two phase detectors are connected to contacts of an incline of site/elevation change over switch 24 which in an upper connection position connects the comparator 212 to a counter 20 and the phase detector 213 to a reversing switch 25 and in a lower connection position connects the comparator 222 to the counter 20 and the phase detector to the switch 25.

The counter 20 has a reset input 201 and a control output 202 which is connected to a gate network 26. This gate network which thus is controlled from the counter 20 has an output 260 connected to a control input of the switch 24, an output 261 connected to the connection point between two outputs 2711, 2721 from two oscillators 271, 272 and a contact 250 on switch 25. Gate network 26 has furthermore an output 262 connected to the oscillator 271 and an output 263 connected to the oscillator 272. Under control from the switch 24, the switch 25 transmits a voltage from the said connection point via the one or the other of two contacts 251 (forward) and 252 (backward) to an energy source 27 for the motors 111, 121. This energy source 27 feeds the motors over a switch circuit 28 which is controlled from the counter 20—gate network 26 and is arranged to feed the motors for rotation in the same or the opposite direction in dependence on incoming control signal on an input 280. For braking the motors 111, 121 there is a rotation brake 29 which on its input side is connected to a further output 2712 and 2722 respectively on the oscillator 271 and 272 respectively.

During the coarse adjustments the motors are fed with direct current voltage through the units 26-261-25-27-28 and during the fine adjustments they are fed with pulses through the units 26-262-271-2711-25-27-28. Already here may be mentioned than when the side position of the tube is set then the fine adjustment of the incline of site takes place automatically with pulses through the units 26-263-272-2721-25-27-28 (phase 5).

In connection with that a mortar carriage is arranged at an ordered place a mechanical adjustment of the tube is made on the basis of available ballistic data. When a shot is fired a settling in the ground takes place whereby the incline of site and/or elevation may be moved from adjusted values.

The automatic arrangement starts to work thereby that the counter 20 is actuated by a pressure wave through the input 201 and is thereby set to the phase 1. This actuation does not take place until after about 0.3 seconds from the firing moment.

During the phase 1 the coarse adjustment of the incline of site takes place. Via the output 260 of the gate network 26, the switch 24 has been set to its upper position shown in FIG. 2 which means that the phase detector 213 transmits a signal to put the switch 25 to "forward" or "backward" in dependence on the sign of the arisen angular deviation, and that the amplitude signal from the series connection 210–211 is compared in the comparator 212 and gives a control signal "0" via the counter 20, the gate network 26, the output 261 and the switch 25 to the energy source 27 and also that a signal for controlling in the opposite directions is transmitted from the gate network 26 via the output 260 and the input 280 to the switch circuit 28. Driving current is therewith fed to the motors 111, 121 until the change in incline of site is on the whole compensated. The amplitude signal from the series connection 210–211 therewith decreases towards zero which causes a control signal "1" from the comparator and adjustment of the counter 20 to the phase 2.

During the phase 2 the coarse adjustment of the elevation takes place. Via the output 260 of the gate network 26 the switch 24 is set to its lower position which means that the phase detector 223 transmits a signal to set the switch 25 and that the amplitude signal from the series connection 220–221 is compared in the comparator 222 and gives a control signal "0" via the counter 20, the gate network 26, the output 261 and the switch 25 to the energy source 27 and also that a signal for controlling in the same direction is transmitted from the gate network 26 via the output 260 and the input 280 to the switch circuit 28. A driving current is therewith fed to the motors 111, 121 until the change in elevation is on the whole compensated. The amplitude signal from the series connection 220–221 therewith decreases towards zero which causes a control signal "1" from the comparator 222 and adjustment of the counter 20 to the phase 3.

During the phase 3 the fine adjustment of the incline of site takes place. The switch 24 is again set to its upper position; the position of the switch 25 is determined by the phase detector 213; the amplitude signal from the series connection 210–211 is compared in the comparator 212 which transmits the signal "0" via the counter 20, the gate network 26 and the output 262 to the oscillator 271 which transmits a series of pulses to the energy source 27; and the switch circuit 28 is switched over to motor driving in different directions. A pulsating drive current is therewith fed to the motors. To accentuate the degree of fine adjustment the said brake 29 is actuated during the pulse holes in the series of pulses with a current from the output 2712 of the oscillator 271 to the brake 29 so that the motors are stopped during every pulse hole. When the amplitude signal decreases towards zero the control signal "1" is received from the comparator 212 and the counter is adjusted to the phase 4.

During the phase 4 the fine adjustment of the elevation takes place. The switch 24 is set to its lower position; the phase detector 223 determines the position of the switch 25; the amplitude signal from the series connection 220–221 is compared in the comparator 222 which if the elevation is not correct transmits the signal "0" via the counter 20, the gate network 26 and the output 262 of the oscillator 271 which again transmits a series of pulses to the energy source 27; and the switch circuit 28 is set for motor driving in the same direction. A pulsating drive current is fed to the motors, and in the pulse holes of this current the brake 29 is activated with current from the output 2712 of the oscillator 271 so that the motors are stopped during the pulse holes. When the elevation again is the right one the control signal "1" is fed from the comparator 222 to the counter. The sequence with the phase 1–4 is therewith terminated and the counter 20 is set to a phase 5 which means fine adjustment of the incline of site at side displacing of the tube 19.

If side displacing of the tube 19 takes place before a shot the adjustment of incline of site is therewith actuated. At this a correction automatically takes place thereby that the phase detector 213 actuates the setting of the switch 25 and the amplitude detector 211—the comparator 212 gives a signal via the counter 20, the gate network 26 and the output 263 to the oscillator 272 which transmits a series of pulses to the energy unit 27 via the output 2721 and one of the inputs 251, 252. As described earlier the brake 29 receives drive impulses during the pulse holes of series of pulses, this time from the oscillator 272 via its output 2722. When the incline of site has been reset to correct value a signal "1" is fed from the comparator 212 to the counter 20 which remains in the phase 5, that is the locked waiting position.

After a shot a reset of counter 20 to the phase 1 takes place and the whole procedure is repeated after the firing.

Further detail information of interest is given below.

The sensor 13 is of a type with two spindles and is fed with a square wave with the frequency 800 Hz from the oscillator 23. Said sensor as one of the resistance arms is included in the wheatstone-bridge which gives amplitude maximum and 180° phase shift when an angular error passes 0.

In order to avoid disturbances from the sensor on the electronics immediately after a shot it is suitable that a blocking of the amplifiers 210, 220 takes place during a time of about 0.3 seconds from the time of firing.

The detectors 211, 221 are of the type "sample and hold" which gives a rapid controlled output-flexibility (short time constant) in spite of a well filtered (smoothed) direct voltage component in relation to the reference input-fault. The sampling happens syncronously with the output voltage from the wheatstone-bridge of the sensor.

Owing to slowness in the motors 111, 121 and other mechanical parts there is an after-rotation during the coarse adjustment phases 1 and 2 which is the reason why in this section of time the automatic control system is overcompensated. The control differences are compensated during the fine adjustment phases 3 and 4 thereby that the motors are correspondingly reversed.

As greater motor power is required to raise the tube 19 than to lower it a monostable multivibrator in the oscillator 271 gives by control from the gate network 26 an increased pulse length in the cases when the elevation is to be increased.

When the sequence with the phases 1–4 is effected a control signal "1" is received from the comparator 222 whereby the counter 20 is stepped forward to the phase 5 and is so blocked for further counting pulses by means of a "feedback"-blockade. By controlling from the gate network 26 the switch 24 is set to the upper position and the switch circuit 28 is set to motor driving in different movement directions.

To secure exact length of the control pulses from the oscillators 271, 272 during varying load conditions for the motors 111, 121 it is suitable to complete the system with a compensating feedback circuit. The motor speed is tested with tackometer generators the outputs of which via an addition circuit and a unit for controlling pulse length are connected to control inputs of the oscillators.

We claim:

1. Apparatus for automatic restoration of the elevation and the azimuth of a mortar tube which is equipped with a support including a holder for the mortar tube and two supporting angularly related legs which are each equipped with an electric motor adjustment device for individual adjustment of their lengths, the apparatus comprising:

a sensor means for detecting changes in the elevation and the azimuth of said mortar tube and for generating respective signals;

a control device coupled to said sensor means and receiving said respective signals, said control device independently controlling each electric motor in said legs, said control device including:

first means for adjusting the lengths of said legs in the same direction by actuation of both motors in said legs dependent upon the signals representative of changes of the elevation; and second means for adjusting the lengths of said legs in respective opposite directions by actuation of corresponding motors in respective legs dependent upon the signals representative of changes of the azimuth.

2. Apparatus for restoration according to claim 1, wherein the control device has a counting unit means for controlling the automatic adjustment of the length of the supporting legs in a sequence, the sequence including two phases for coarse adjustment of the elevation and azimuth and two phases for fine adjustment of the elevation and the azimuth.

3. Apparatus for restoration according to claim 2, wherein the control device includes means for generating direct current drive applied to the electric motors during the coarse adjustments and means for generating a pulse drive current during the fine adjustments.

4. Apparatus for restoration according to claim 3, further including a brake arranged to actuate the motors by feeding current thereto from an oscillator during the pulse holes of the said pulse drive current.

* * * * *